UNITED STATES PATENT OFFICE.

EDUARD MEUSEL, OF LIEGNITZ, GERMANY.

PROCESS OF MANUFACTURING A FERRUGINOUS ADDITION TO CATTLE FOOD.

No. 866,499.  Specification of Letters Patent.  Patented Sept. 17, 1907.

Application filed August 19, 1904. Serial No. 221,417.

*To all whom it may concern:*

Be it known that I, EDUARD MEUSEL, a subject of the King of Prussia, residing at 8 Breslauerstrasse, Liegnitz, Silesia, in the Kingdom of Prussia and Empire of Germany, have invented a new and useful Improved Process of Manufacturing a Ferruginous Addition to Cattle Food, of which the following is a specification.

My invention relates to an improved process of manufacturing a ferruginous preparation designed to be added to cattle food. According to my said invention a ferric phosphate preparation designed to be incorporated with cattle food is produced by the treatment of deglutinated bone dust or bone charcoal with a solution of ferric sulfate, nitrate or chlorid. By this means I obtain a product constituting an extremely cheap, easily soluble and very digestible preparation which is readily absorbed.

For preparing the ferric phosphate I allow concentrated solution of ferric sulfate to act upon deglutinated bone dust or bone charcoal. To obtain a concentrated solution of ferric sulfate, ferric hydrate is dissolved, while agitating, in dilute sulfuric acid to saturation. From 90 to 120 liters of this concentrated solution is added gradually to 50 kilograms of deglutinated bone dust or pulverized bone charcoal until the mixture becomes pulpy. After cooling and solidifying the mixture is dried. By this process I produce finely divided ferric phosphate which is extremely soluble in dilute acids and several solutions of salt, and which has therefore a physiological importance.

In lieu of ferric sulfate I may also employ in a similar manner either ferric nitrate or chlorid, which substances are the equivalents of ferric sulfate.

The feeding trials made with cattle food containing this preparation, in the case of milk-giving cattle, have shown an increase in the proportion of fat in the milk and a greater voracity of the animal. For instance the addition of the ferruginous preparation—of 8 gr. for cattle of big size, of 4 gr. for cattle of small size, of 3 to 1 gr. for young cattle and poultry, is made per animal to the daily quantity of food.

By the employment of bone dust or bone charcoal as the initial material, I succeed in producing the ferric phosphate at such a cheap rate that every farmer will be in a position to keep up and improve the state of health of his milk-giving cattle.

What I claim as my invention, and desire to secure by Letters Patent, is:—

The herein described process which consists in dissolving ferric hydrate in sulfuric acid to saturation to form a solution of ferric sulfate, adding about 100 liters of this solution gradually to every 50 kilograms of deglutinated bone dust until the mixture becomes pulpy and then cooling and drying said mixture.

In testimony whereof I have signed my name to this specification in the presence of two subscribing witnesses.

EDUARD MEUSEL.

Witnesses:
ERNST KATZ.
ALBERT SCHENK.